(12) United States Patent
Hashimoto et al.

(10) Patent No.: US 7,153,119 B2
(45) Date of Patent: Dec. 26, 2006

(54) APPARATUS FOR EXTRUDING FOOD DOUGH

(75) Inventors: Shigeru Hashimoto, Utsunomiya (JP); Kiyoshi Hasegawa, Utsunomiya (JP)

(73) Assignee: Rheon Automatic Machinery Co., Ltd. (JP)

( * ) Notice: Subject to any disclaimer, the term of this patent is extended or adjusted under 35 U.S.C. 154(b) by 303 days.

(21) Appl. No.: 10/436,766

(22) Filed: May 13, 2003

(65) Prior Publication Data

US 2003/0215552 A1    Nov. 20, 2003

(30) Foreign Application Priority Data

| May 14, 2002 | (JP) | ............................... 2002-139320 |
| Jul. 8, 2002 | (JP) | ............................... 2002-235271 |
| Aug. 1, 2002 | (JP) | ............................... 2002-225150 |

(51) Int. Cl.
    *A23L 1/00* (2006.01)
(52) U.S. Cl. ............... 425/192 R; 425/215; 425/133.1; 425/381; 425/382.3; 425/381.2
(58) Field of Classification Search ............... 425/215, 425/190, 192 R, 133.1, 381, 382.3, 381.2
See application file for complete search history.

(56) References Cited

U.S. PATENT DOCUMENTS

| 4,450,131 A | * | 5/1984 | Martinek | .................. 264/209.2 |
| 4,575,443 A | * | 3/1986 | Moen et al. | .................. 264/161 |
| 4,919,459 A | * | 4/1990 | Miller | ...................... 285/123.8 |
| 5,332,379 A | * | 7/1994 | Baumgarten | .................. 425/107 |
| 5,667,818 A | * | 9/1997 | Guillemette | .............. 425/133.1 |
| 6,447,279 B1 | * | 9/2002 | Guillemette et al. | ........ 425/107 |

FOREIGN PATENT DOCUMENTS

| JP | 3119944 | 5/1991 |
| JP | 8023867 | 1/1996 |
| JP | 2001333689 | 12/2001 |

* cited by examiner

*Primary Examiner*—Joseph S. Del Sole
(74) *Attorney, Agent, or Firm*—Jackson Walker, LLP

(57) ABSTRACT

An extruding apparatus for food materials having a filling material and a wrapping material extrudes and envelops the filling material with the wrapping material. An internal cylinder supplies the filling material while a concentrically arranged external cylinder creates an annular space for extruding and enveloping the material supplied. The wrapping material is fluidized by a fluidizer accommodated in the annular space. A driving mechanism is sealed from the fluidizer and drives the fluidizer in the annular space. The driving mechanism is driven by a transmission mechanism. A storage space section near the seals prevents wrapping material from penetrating the driving mechanism.

12 Claims, 14 Drawing Sheets

APPARATUS FOR EXTRUDING FOOD DOUGH

FIELD OF THE INVENTION

This invention relates to an apparatus for continuously exuding food dough for a food such as a cake or bread. More particularly, it relates to an apparatus for encrusting one or more filling materials with one or more wrapping materials of a uniform thickness to make a food of a multilayer structure, such as confectionary or breads filled with one or more jams.

BACKGROUND OF THE INVENTION

An apparatus for extruding food dough to encrust a filling material comprises an external cylinder and an inner cylinder placed concentrically. A filling material such as a bean jam is supplied in an inner cylinder part. A crust material for wrapping the filling material is supplied in an annular space between the external cylinder and the inner cylinder placed concentrically. The filling material is extruded from an inner nozzle. Simultaneously, the crust material is extruded from a narrow annular nozzle region between the inner and outer nozzles so that they form a continuous, multi-layered and bar-shaped food dough.

As food dough supplied in an annular space is extruded from a progressively narrower annular nozzle region, the food dough needs to be pressurized for feeding. When the food dough includes small lumps or materials of different properties or does not have a uniform dispersion as a whole, it may not be stably extruded.

According to the prior art, in order to solve such a technical problem, a stirring stick or a stirring feather is installed to be rotated or swung in an annular space between the external cylinder and the inner cylinder to fluidize the food dough therein. But the prior art cannot sufficiently solve the problem of food dough penetrating the seal members arranged between a rotating or swinging body with a stirring stick or a stirring feather and an upper external cylinder or a lower external cylinder such as an external nozzle.

Also, various stresses work on a rotating body with stirring sticks or stirring feathers. The food dough penetrates the sealing members, bearing members supporting the rotating body, and, further a driven gear engaged with the rotating body. Therefore, the food dough penetrating the bearing members and the driving gear greatly increases a frictional force and generates high frictional heat. Accordingly, the rotation of the driven member incorporated in the rotating member is obstructed.

According to this invention, in order to solve such problems, a stirring stick or a sing feather is installed to be rotated or swung in an annular space section between the external cylinder and the inner cylinder to fluidize the food dough therein. Further, a temporary storage space for food dough penetrating the seal members is arranged between the bearing section and the sealing section. Also further, the structure of this apparatus is improved so as to be easily and simply disassembled and reassembled.

Further, according to this invention, the structure of the seal members is improved to control the penetration of food dough through them. Also, in order to facilitate the removal of food dough penetrating the seal members, the structure of the apparatus is improved to be able to be disassembled and reassembled in a simple manner from one direction.

SUMMARY OF THE INVENTION

The first means for solving the problems, according to this invention, is an apparatus for extruding food dough comprising a rotating member, which is installed through sealing portions between an upper external cylinder and a lower external cylinder, incorporated in a driven rotating member supported between bearing members, and a temporary storage space section for food dough penetrating the seal portions, arranged between the bearing members and the sealing portions.

The second means for solving the problem, according to this invention, is an apparatus for extruding food dough comprising a rotating member, which is installed through sealing portions between an upper external cylinder and a lower external cylinder, incorporated in a driven rotating member supported between bearing members, and a three-step arrangement having a first step section, arranged on an upper portion of a base member, for incorporating a fitting step part of the upper external cylinder, a second step section, arranged on a driven rotating member, for incorporating a fitting step part of the rotating member, and a third step section, arranged on a lower portion of the base member, for incorporating a fitting step part of the lower external cylinder, in order to be disassembled and reassembled from one direction.

The third means for solving the problem according to this invention is a sealing device of an apparatus for extruding food dough comprising a resilient sealing surface, which has one or more helicoid or spiral grooves thereon, installed at a small distance from the other sealing surface and which moves relative to the other sealing surface, to push back food dough penetrating between the sealing surfaces.

The fourth means for solving the problem according to this invention is a sealing device, wherein the resilient sealing surface is cylindrical.

BRIEF DESCRIPTIONS OF THE DRAWINGS

Figure 13:
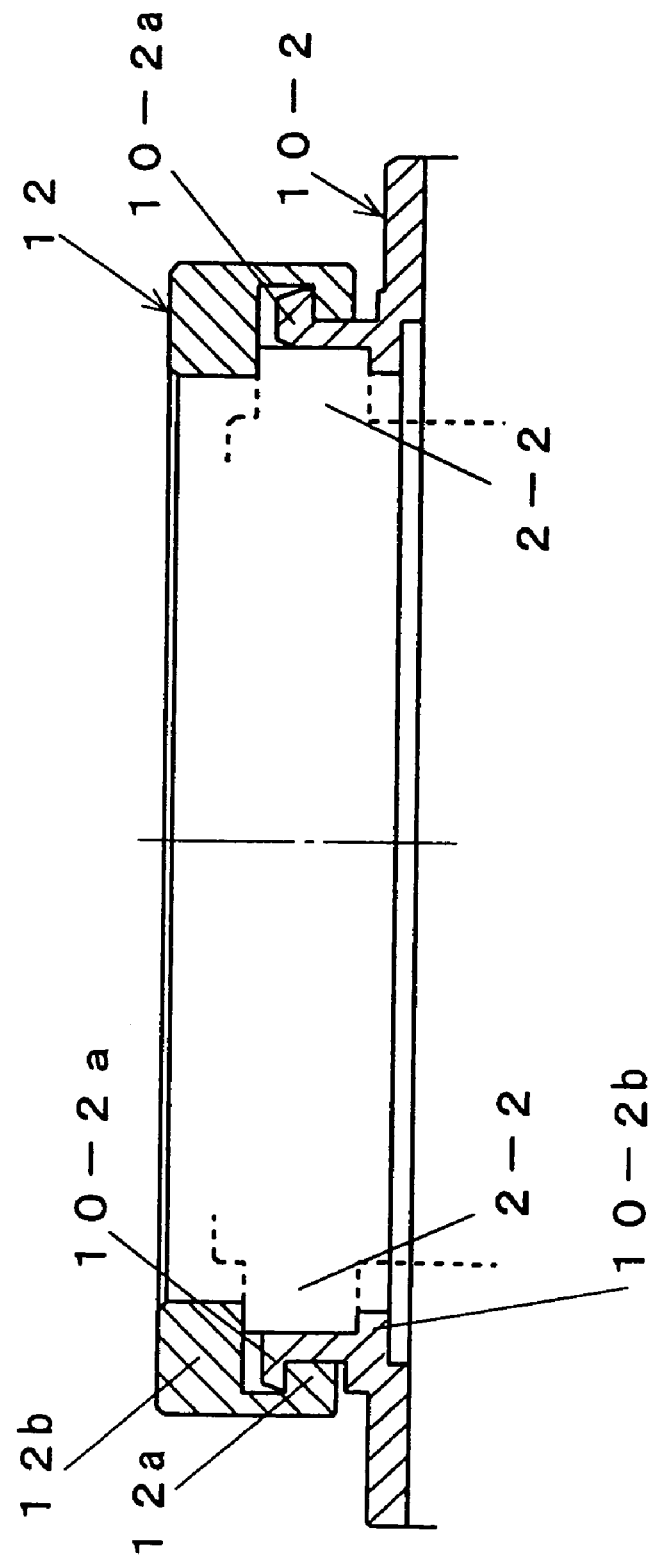

FIG. 13 shows the positional relation among the upper external cylinder 2-1 (shown by dotted lines), a fixing device 12 for fixing the upper external cylinder 2-1 into the upper portion 10-2 of the base member 10, and the upper base member 10-2 (the upper portion of the base member 10).

Figure 14:
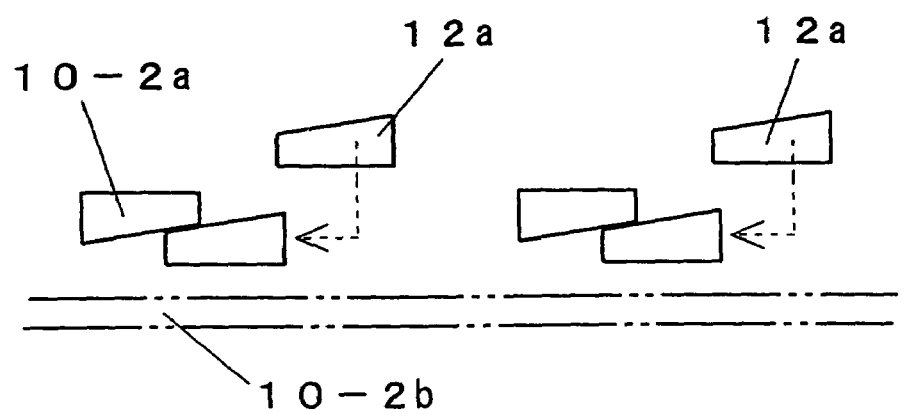

FIG. 14 shows a conceptual view for illustrating the assembling and disassembling processes of the upper external cylinder 2-1, the upper base member 10-2, and the fig device 12.

Figure 2:
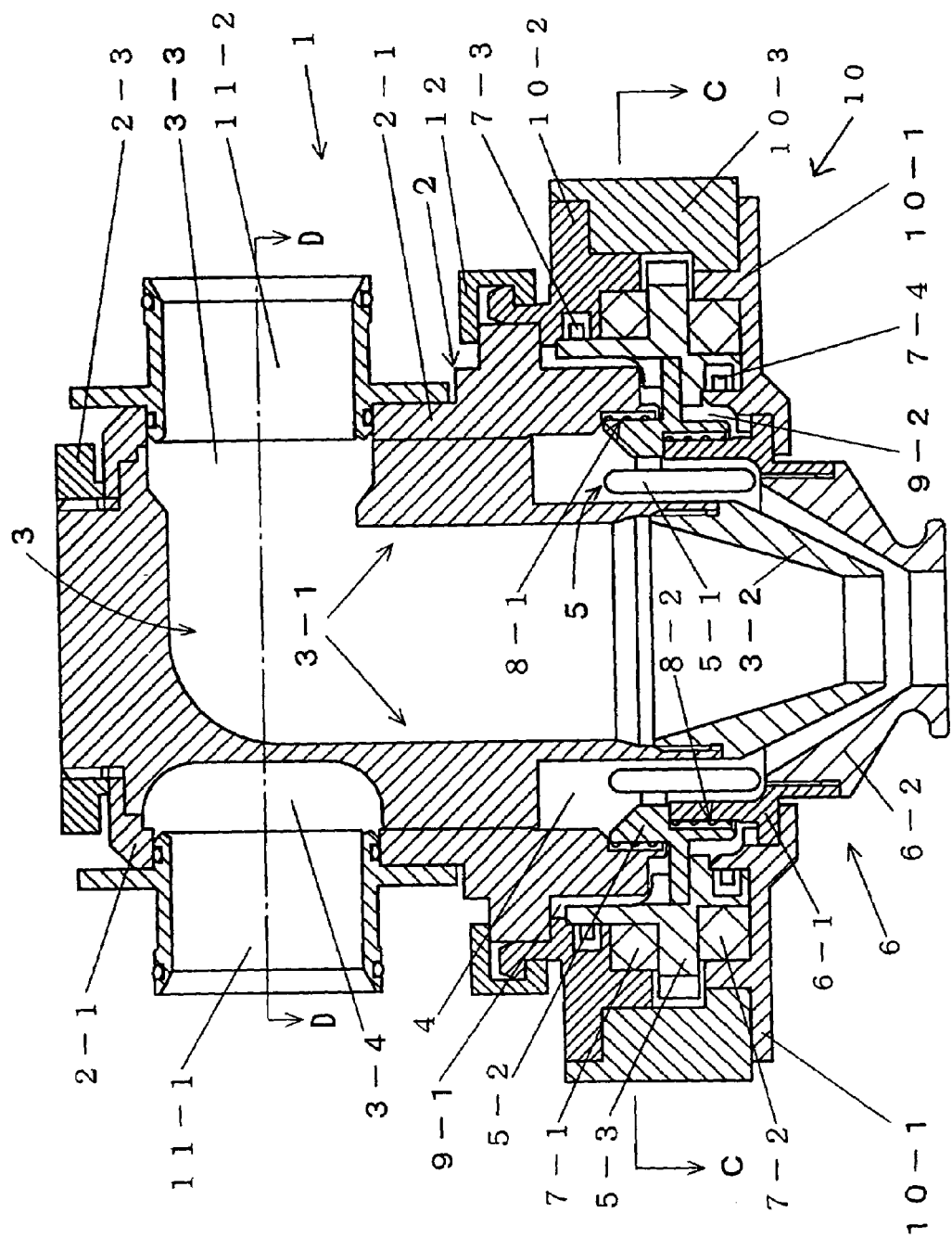
FIG. 2 shows a cross-sectional view of one embodiment of the apparatus for extruding food material of this invention in cross-section A—A of FIG. 1.
Figure 15:
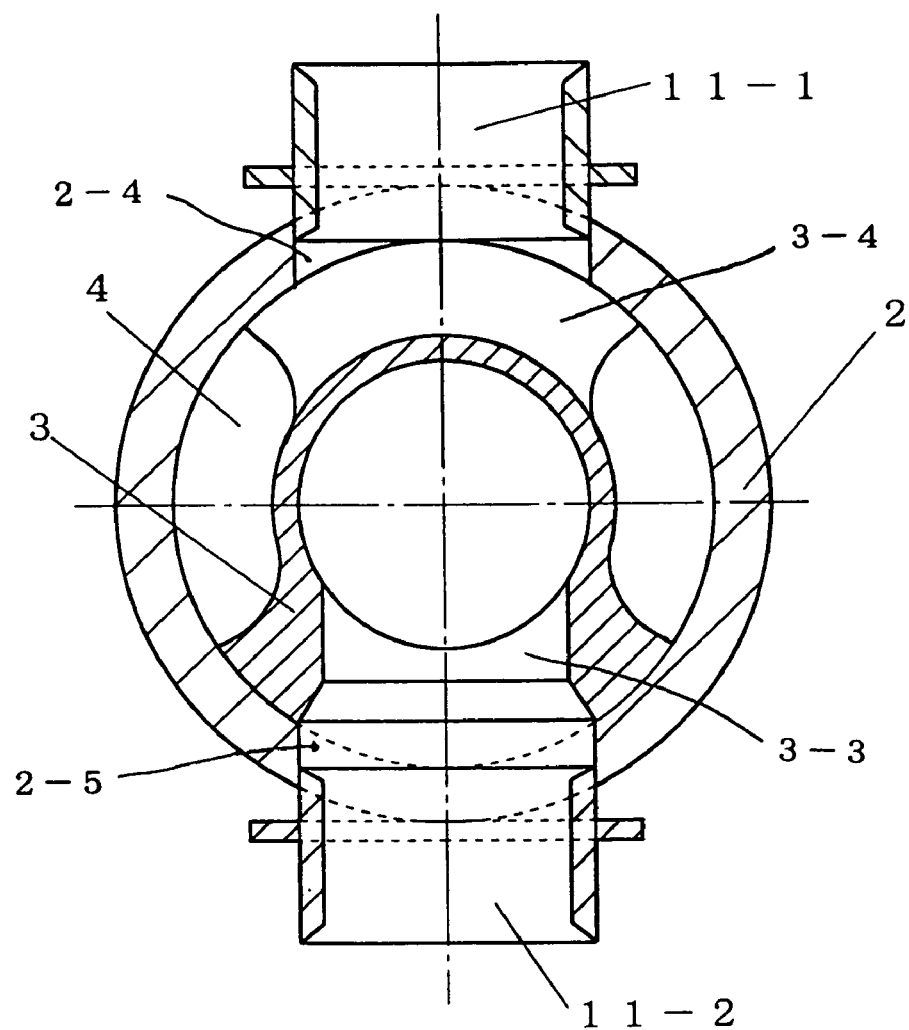

FIG. 15 shows a cross-sectional view in D—D of FIG. 2 of an assembly of the external cylinder 2 and the internal cylinder 3.

Figure 16:
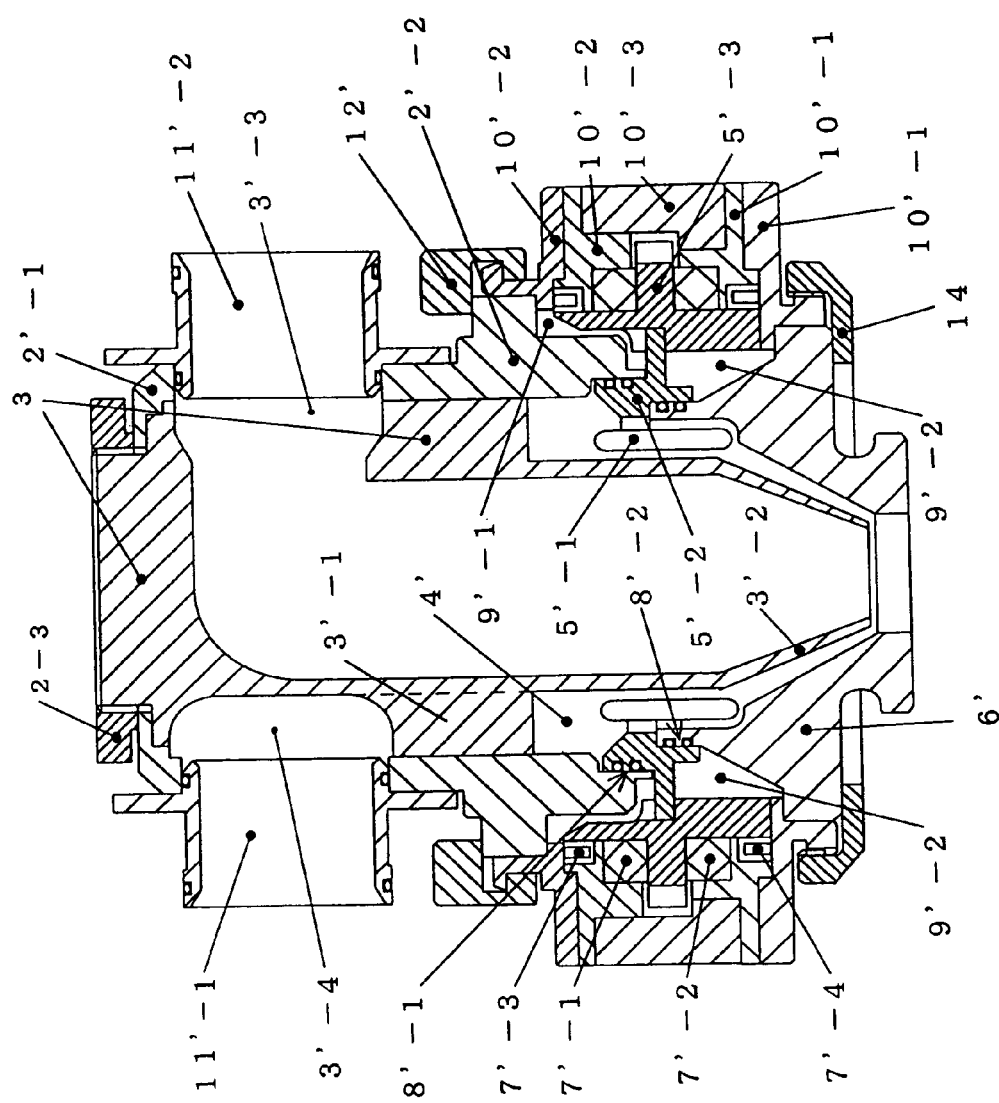

FIG. 16 shows a diagrammatic view in longitudinal section of another embodiment of the present invention

DENOTATION OF THE NUMBERS 1 shows an apparatus for extruding food dough.
2 shows an external cylinder.
2-1 shows an upper external cylinder.
3 shows an internal cylinder.
3-2 shows an internal nozzle.
4 shows an annular space section.
5 shows a rotating body.
5-1 shows a stirring member.
5-2 shows a rotating member.
5-3 shows a rotating part.
6 shows an external nozzle.
8 shows a sealing member.
9 shows a storing section.
10 shows a base member.
11 shows an opening to be supplied with food dough.
12 shows a fixing device of an upper external cylinder.
13 shows a driven gear.

DETAILED DESCRIPTION OF THE PREFERRED EMBODIMENTS

Crust material consisting of food dough is extruded from the narrow annular space between the external and internal nozzles. Therefore, the crust material needs to be pressurized to some extent. Then, the density of the crust material becomes non-homogeneous and unstable. When the crust material also includes some small lumps or some materials of different properties, the crust material may be clogged in the narrow annular space, and cannot be extruded stably.

But, the rotating or swinging sticks arranged in the narrow annular space part stir and fluidize the food dough passed therethrough. This fluidization suppresses the food dough that has been pressurized in the narrow space part and enables it to be extruded stably through the inwardly tapered circular nozzle region.

However, the food dough leaks out from the pressurized annular space part through the sealing section toward the bearing members supporting the rotating member and impairs the rotating member from revolving stably. To solve this problem, this invention provides that a temporary storage space section for food dough penetrating the sealing members is arranged between the bearing members and the sealing members. As the pressure in the temporary storage space section may be set lower than that in the other divisions, the penetration of food dough through the sealing members to the bearing members can be prevented.

Consequently, according to this invention, food dough can be extruded without pulsating. Also, the weight per food product does not fluctuate. Any fluctuation of the weight per food product can be suppressed. Further, the stable condition of the extrusion or encrusting can be maintained for a long time.

According to this invention, to incorporate a lower cylinder, a rotating member and an upper cylinder in the base plate of the apparatus, the apparatus comprises a stepped arrangement that includes a step-shaped section, arranged in the lower part of the base plate, for fitting the lower external cylinder, a step-shaped section arranged in a driven member, for fitting the rotating member, and a step-shaped section, arranged in the upper part of the base plate, for fitting the upper external cylinder. Further, the lower cylinder, which is an example of an external nozzle, the rotating member with stirring members, and the upper external cylinder are superimposed in this order. Then, they can be disassembled and reassembled from one direction.

Also, according to this invention, the seal portions have a small clearance or gap between the rotating member and the upper external cylinder, and between the rotating member and the lower external cylinder. Both sealing surfaces of the sealing portion with the small clearance between them slide relative to each other. One or more helicoid or spiral grooves are arranged on one of either sealing surface, in order to push back food dough penetrating between the sealing surfaces.

As the sealing surfaces do not directly contact each other, because there is a small clearance between them, the generation of heat can be controlled to be at a low level. The pushing-back force works on food dough by one or more helicoid or spiral grooves, like right-handed or left-handed screws, placed on a sealing surface. If the pushing-back force is balanced with the penetrating force of the food dough, the penetration of the food dough would be stopped in a balanced position. Further, the resilient sealing surface with the helicoid or spiral grooves can control the width of the clearance.

Figure 1:
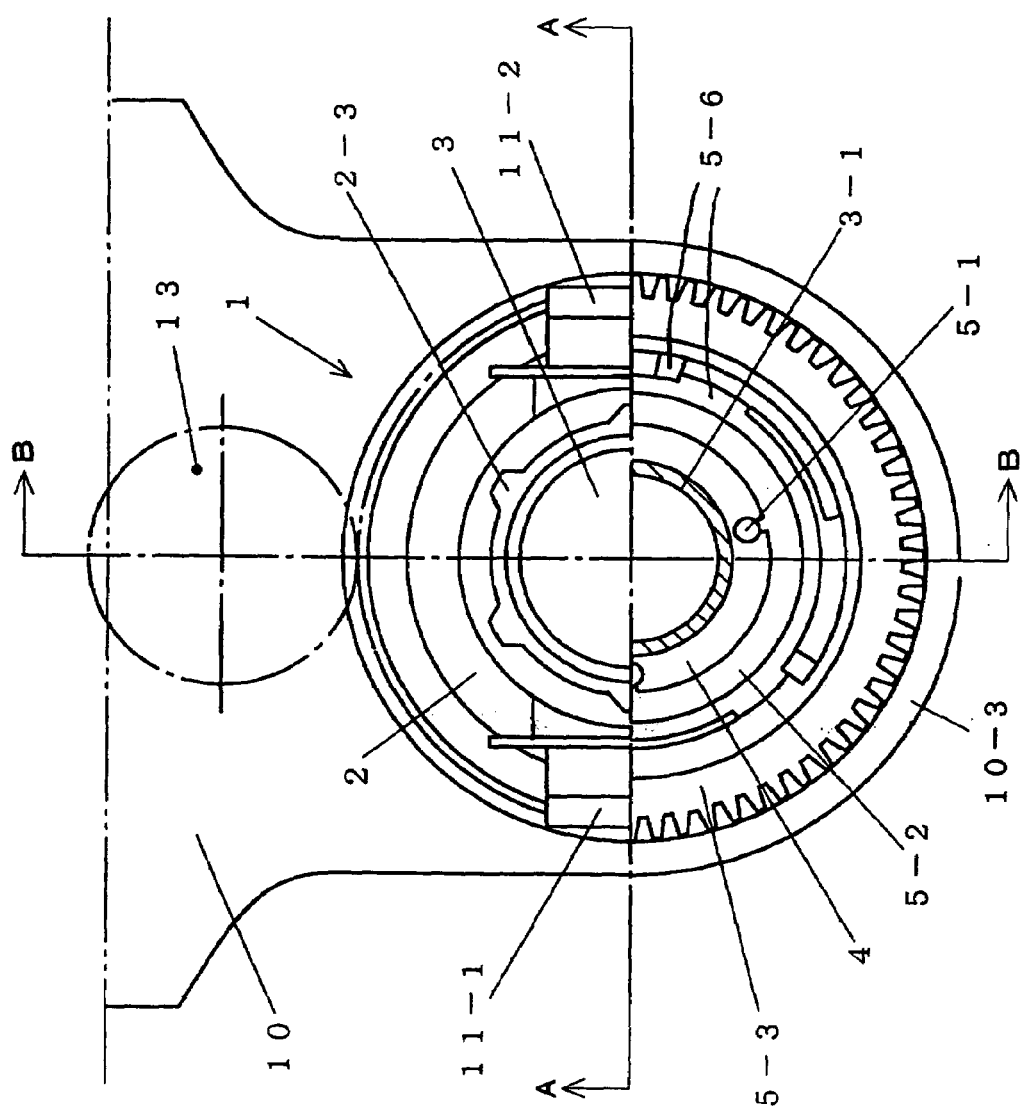
FIG. 1 shows a plan view and partially an explanatory cross-sectional view (a cross-section C—C in FIG. 2) of an apparatus for extruding food dough as one embodiment of this invention.

FIG. 1 shows a plan view and a partial explanatory cross-sectional view (a cross-section C—C FIG. 2) of an apparatus for extruding food dough as one embodiment of this invention. In FIG. 17 an apparatus 1 for extruding food dough, an external cylinder 2, a nut member 2-3 for incorporating an external cylinder 2 on an internal cylinder 3, an upper internal cylinder 3-1, an annular space section 4, a stirring stick 5-1, a rotating member 5-2, a driven gear 5-3, a base member 10, an opening 11-1 for crust materials, an opening 11-2 for filling materials, and a driving gear 13 are shown.

Figure 10:
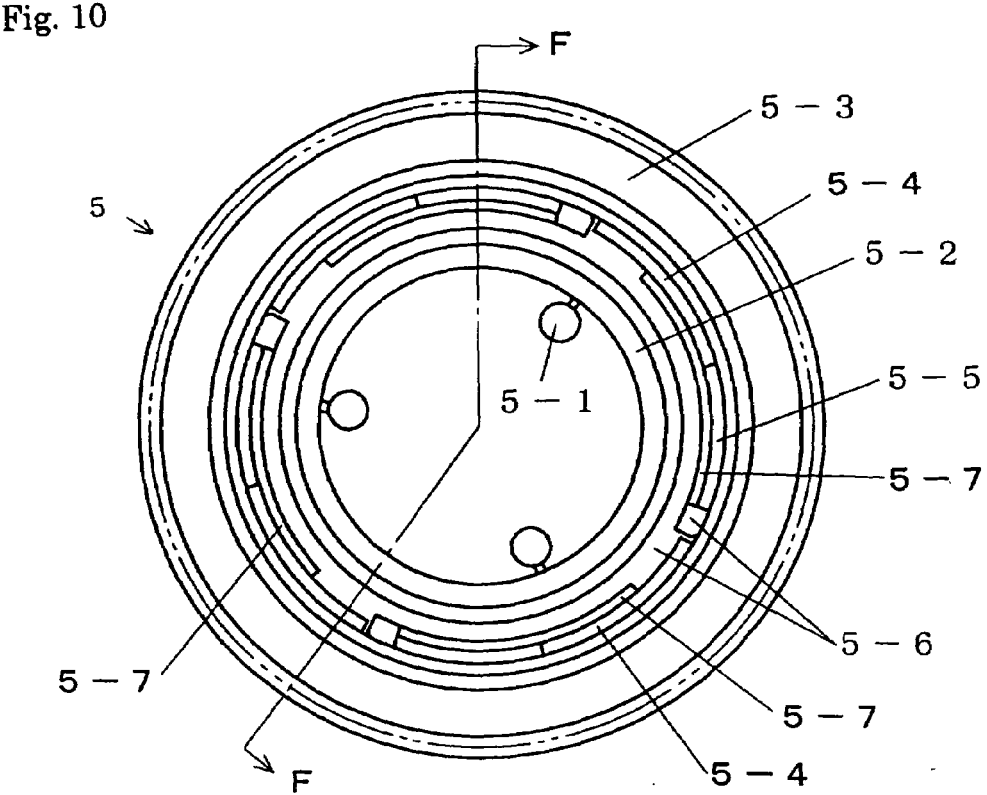
FIG. 10 shows a plan view of a rotating body 5 of an embodiment of this invention.
Figure 11:
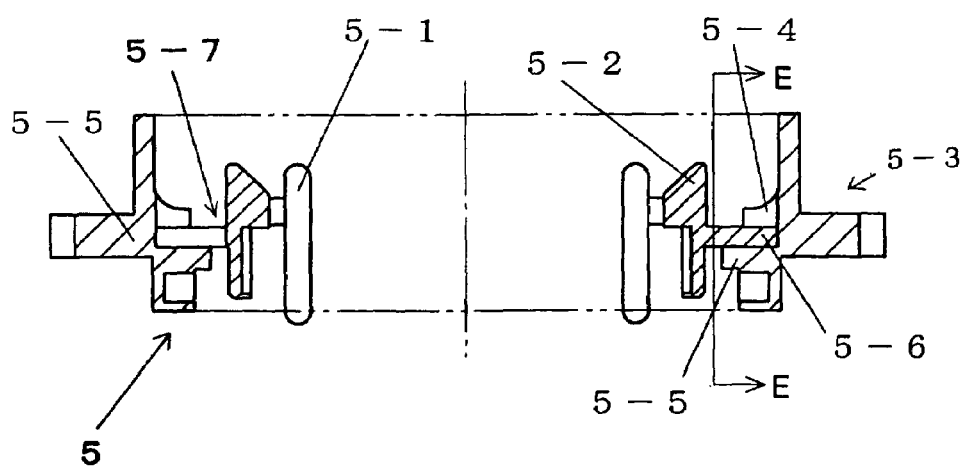
FIG. 11 shows a sectional view (F—F shown in FIG. 10) of the rotating body 5 of an embodiment of this invention.

FIG. 2 shows a cross-sectional view of one embodiment of the apparatus for extruding food material of this invention in cross-section A—A of FIG. 1. An apparatus 1, for extruding food dough, has an external cylinder 2 and an internal cylinder 3 positioned concentrically. In FIG. 2, an upper external cylinder 2-1, and a nut member 2-3 for fixing an upper external cylinder 2-1 on an internal cylinder 3, are shown. An annular space section 4 is formed between an external cylinder 2 and an internal cylinder 3. Also, in FIG. 2, a rotating body 5 having stirring sticks 5-1, a rotating member 5-2, and a driven gear member 5-3, are shown. Details of the rotating body 5 are shown in FIGS. 10–11 as described below.

An external nozzle part 6, corresponding to a lower external cylinder, is fixed to a lower part of an upper external cylinder 2-1. The upper part of the internal cylinder 3 is an upper internal cylinder 3-1. An internal nozzle part 3-2 is screwed into the lower part of the upper internal cylinder 3-1. An opening part 3-3 is arranged in the internal cylinder 3 to be supplied with filling materials. An opening part 3-4 is arranged in the internal cylinder 3 to be supplied with crust materials.

Moreover, bearing members 7-1, 7-2, sealing members 7-3, 7-4, for bearing members 7-1, 7-2, and the supporting rotating member 5, are shown in FIG. 2. The rotating member 5-2 and the stirring members 5-1 are arranged between the upper external cylinder 2-1 and the external nozzle part 6 via an upper sealing member 8-1 and a lower sealing member 8-2.

The rotating member 5-2 for stirring is incorporated in a gear member 5-3. They can be disassembled and reassembled. A nozzle body 6-2 of the external nozzle member 6 is screwed into a fitting part 6-1 of the external nozzle member 6. A temporary storage space section temporarily stores food dough penetrating the sealing members 8-1, 8-2. The storage space section comprises an upper storage space section 9-1 and a lower storage space section 9-2. Both storage space sections 9-1, 9-2 are connected to each other through through-holes 5-7. A base member 10 includes a lower base member 10-1 and an upper base member 10-2. An opening 11-1 for crust materials is connected to an opening part -34 of the internal cylinder 3. An opening 11-2 for filling materials is connected to an opening part 3-3 of the internal cylinder 3.

Figure 3:
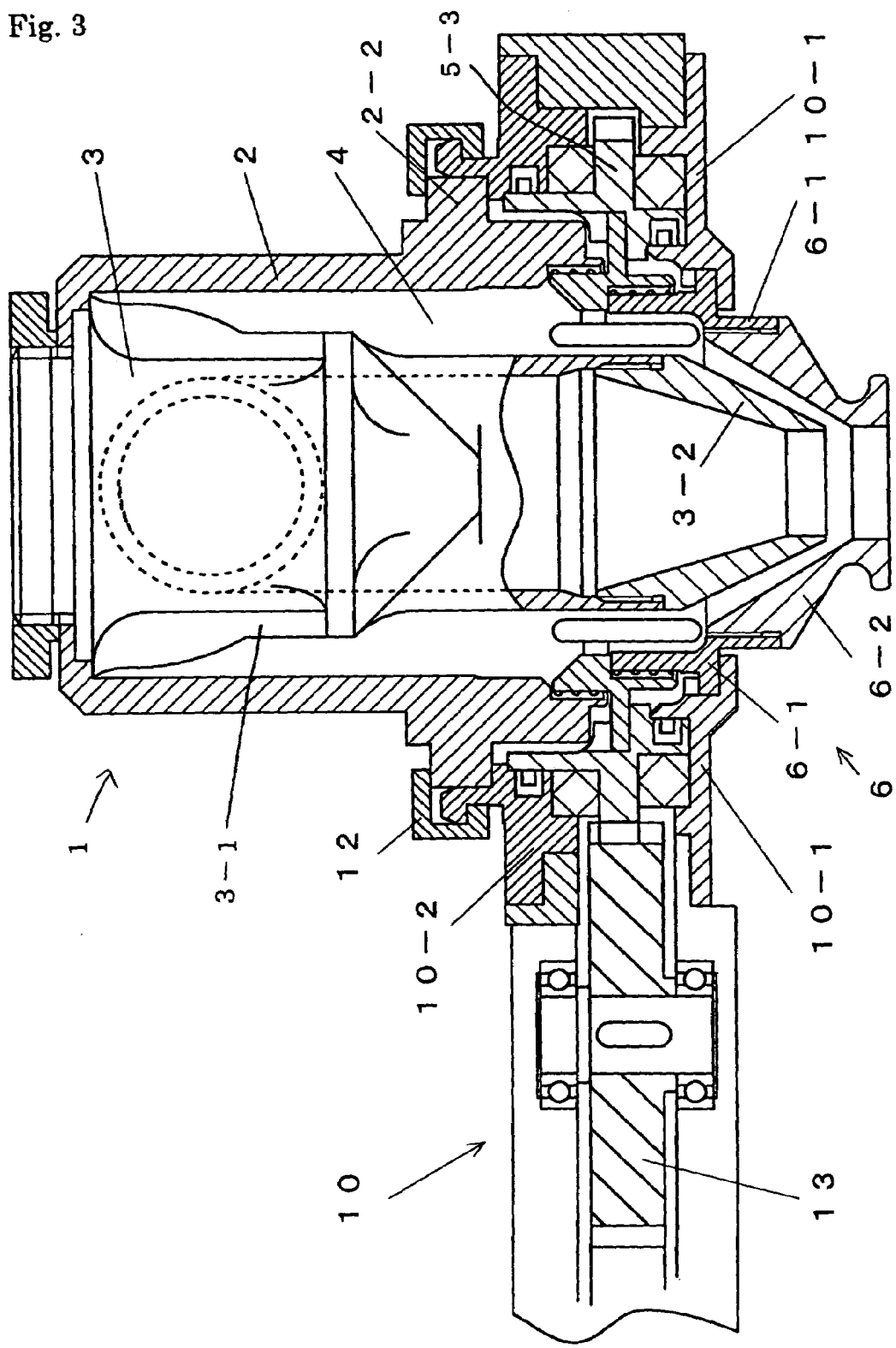
FIG. 3 shows a cross-sectional view of one embodiment of the apparatus for extruding food material of this invention in cross-section B—B of FIG. 1.

FIG. 3 shows a cross-sectional view of one embodiment of the apparatus for extruding food material of this invention in cross-section. B—B of FIG. 1. A driving gear 13 is engaged in the driven gear 5-3.

Figure 4:
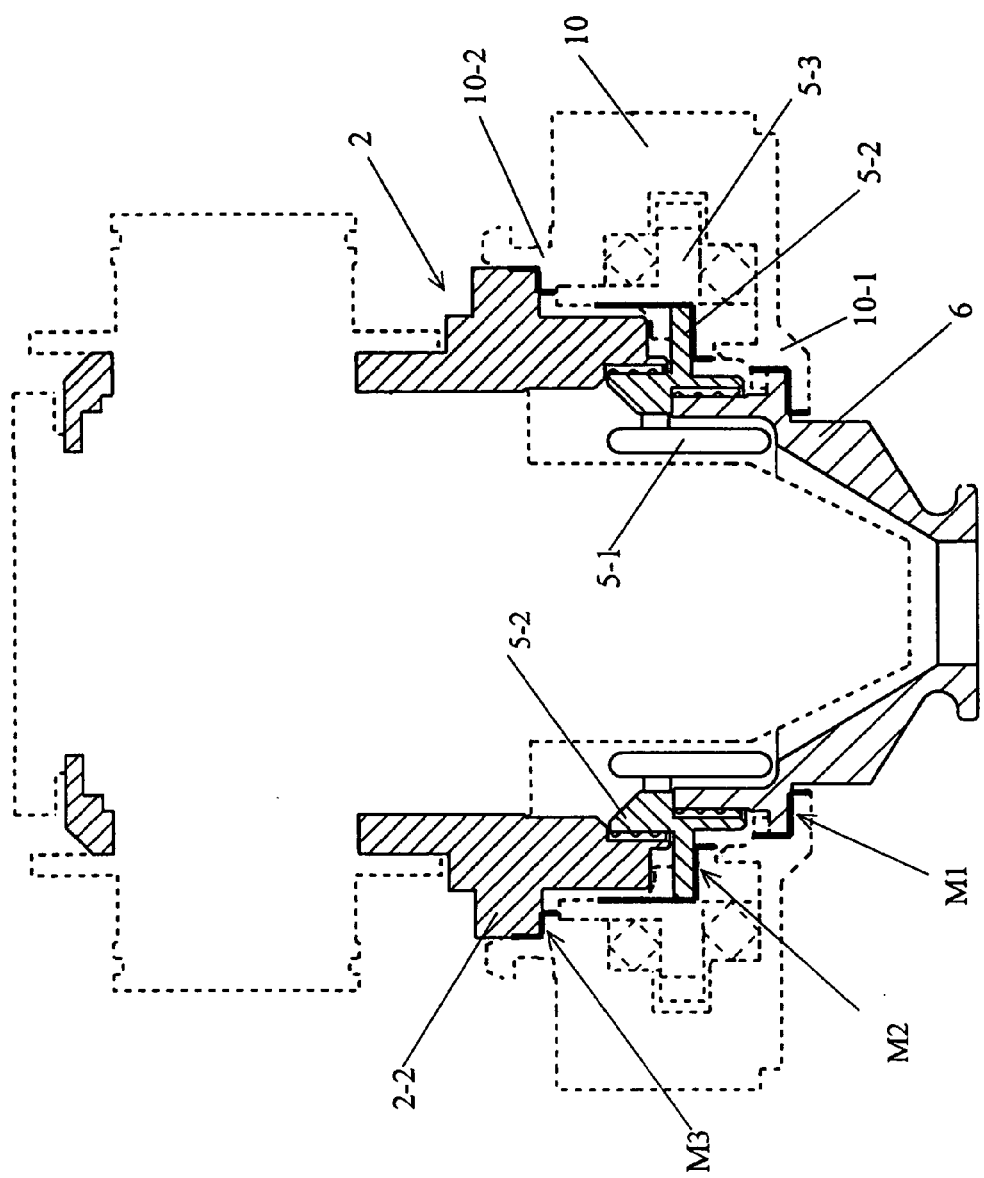
FIG. 4 shows a schematic view of a stepped arrangement M of an embodiment of this invention.

FIG. 4 shows a schematic view of a stepped arrangement M of an embodiment of this invention. The stepped arrangement M is illustrated in thick lines M1, M2, M3. A step-shaped section M1 for fitting the external nozzle 6 into the stepped portion of the lower base member 10-1, a step-shaped section M2 for fitting the rotating member 5-2 into the stepped portion of the driven gear 5-3, and a step-shaped section M3 for fitting the upper external cylinder 2-1 into the stepped portion of the upper base member 10-2, are shown in FIG. 4, when the internal cylinder 3 is previously incorporated in the upper external cylinder 2-1, these cylinders 3, 2-1 are integratedly installed in the base member 10 and integratedy detached from the base member 10. The cylinders 3, 2-1 can be disassembled from each other.

The external nozzle member is installed in the stepped portion M1 of the lower base member 10-1. The rotating member 5-2 is installed in the stepped portion M2 of the driven gear 5-3 The upper external cylinder 2-1 is installed in the stepped portion M3 of the upper base member 10-2. Therefore, it is easy and simple to assemble the apparatus 1, for extruding food dough, sequentially from the bottom, and to disassemble it sequentially from the top, because of the stepped arrangement M.

Consequently, it becomes easy to disassemble and assemble the apparatus 1 for extruding food dough. Also, it becomes easy to clean etc., the inside, etc., of the apparatus.

Figure 5:
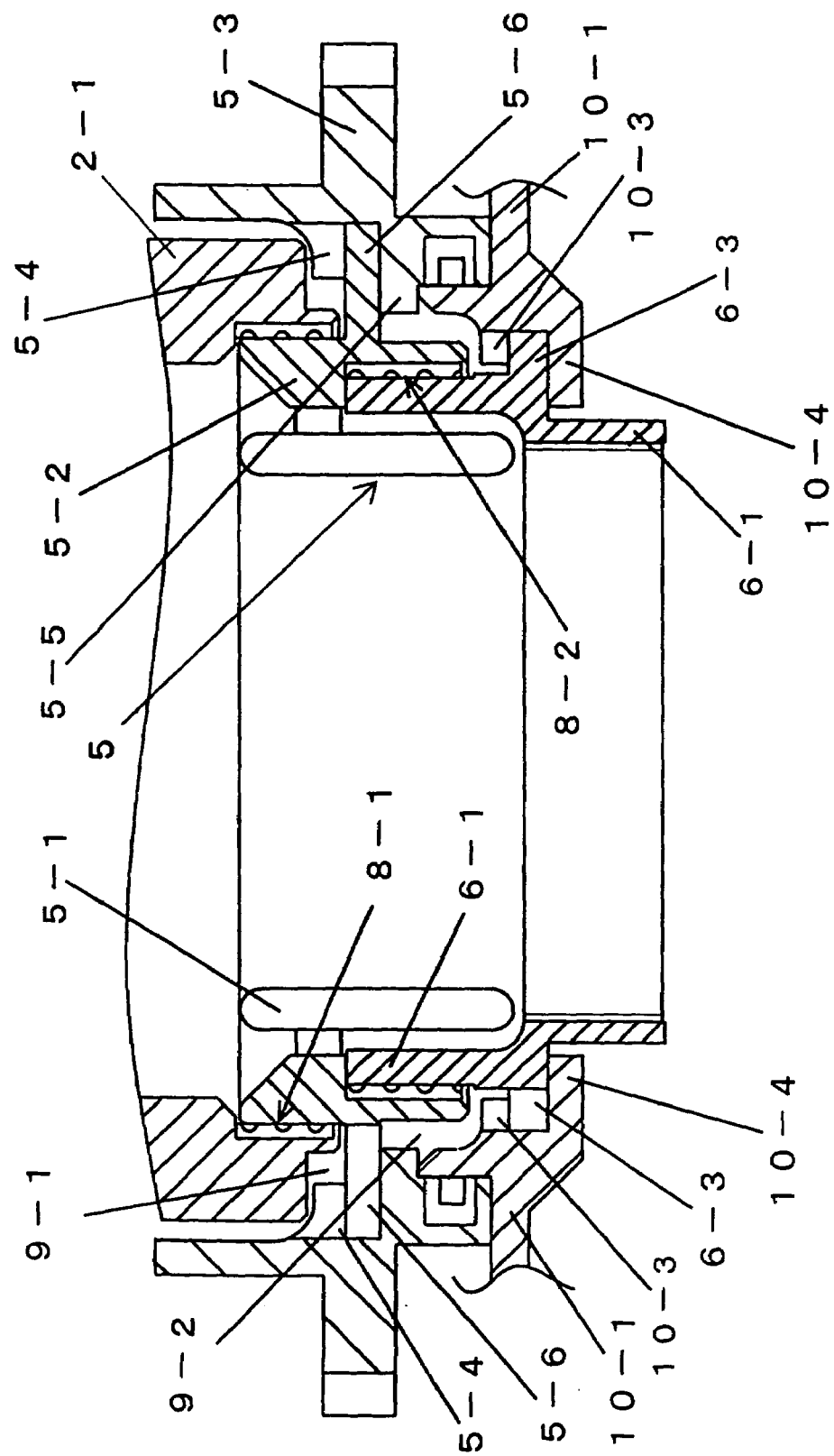
FIG. 5 shows an enlarged sectional view of a section for arranging the sealing members 8-1, 8-2.

FIG. 5 shows an enlarged sectional view of a section for arranging the sealing members 8-1, 8-2. An upper sealing member 8-1 is installed between the lower portion of the upper external cylinder 2-1 and the upper portion of the rotating member 5-2. A lower sealing member 8-2 is installed between the lower portion of the rotating member 5-2 and the upper portion of the fitting part 6-1 of the external nozzle member 6.

Figure 6:
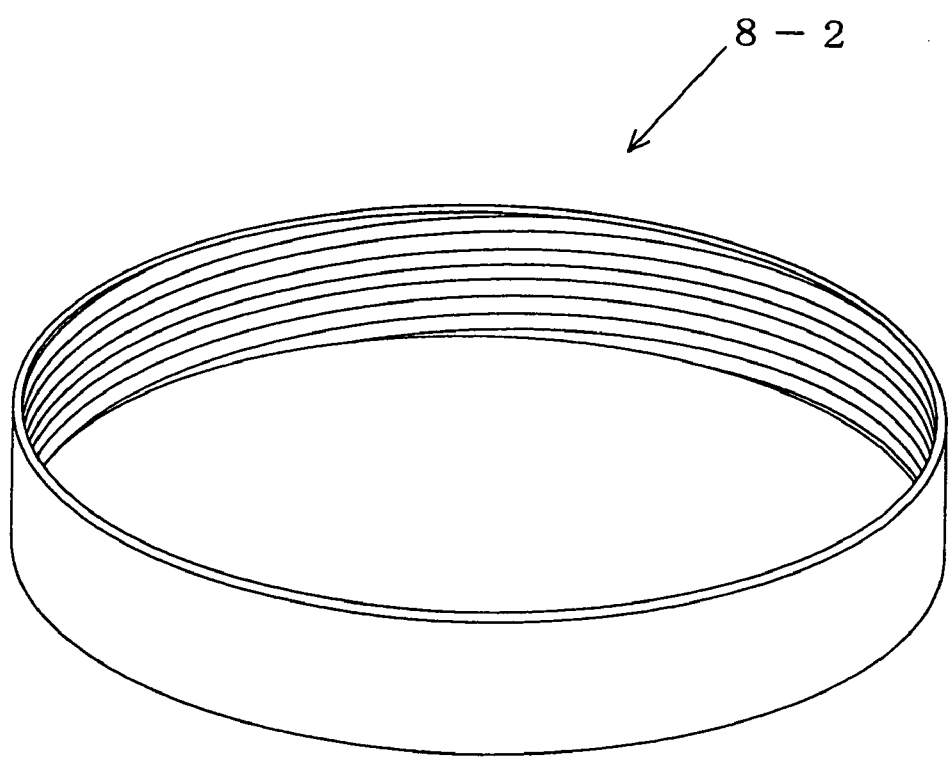
FIG. 6 shows a perspective view of a lower sealing member 8-2.

FIG. 6 shows a perspective view of a lower sealing member 8-2. A perspective view of the upper sealing member 8-1 is omitted, because it is similar to that of the lower sealing member 8-2. Polyurethane is adopted as one of the materials of the sealing members 8-1, 8-2. The materials of the sealing members 8-1, 8-2 may be composed of ultra-high molecular weight polyethylene, high-density polyethylene, polyacetal, or ethylene tetra-fluoride, etc.

The materials of the parts for contacting food dough should adhere to food dough as little as possible.

Figure 7:
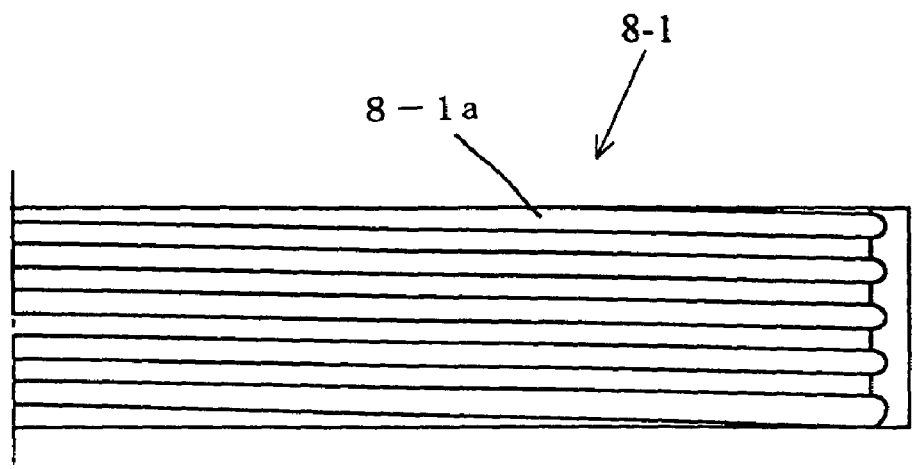
FIG. 7 shows a sectional view of a part of the upper sealing member 8-1.

FIG. 7 shows a sectional view of a part of the upper sealing member 8-1. When the rotating member 5-2 rotates in the leftward direction, its groove is formed like a right-hand thread. The radius and the depth of the groove are each 0.8 nm. The pitch between the grooves is 3 mm. The sealing member is 19 mm thick. The outside diameter of it is 120.2 mm. The inside diameter of it is 116.4 mm. The width of it is 14.5 m. Using elasticity, this sealing member is fitted in the fitting groove, the inside diameter of which is 120.0 mm, arranged on the inside surface of the lower portion of the upper external cylinder 2-1. In this case the inside diameter of the sealing member will be about 116.2 mm. As the outside diameter of the seal portion of the rotating member for agitation is 116.0 mm, the clearance between the seal portion of the rotating member 5-1 and the inside diameter of the fitted sealing member 8-1 will be about 0.1 mm on one side. Also, a plurality of grooves may be arranged in parallel.

Figure 8:
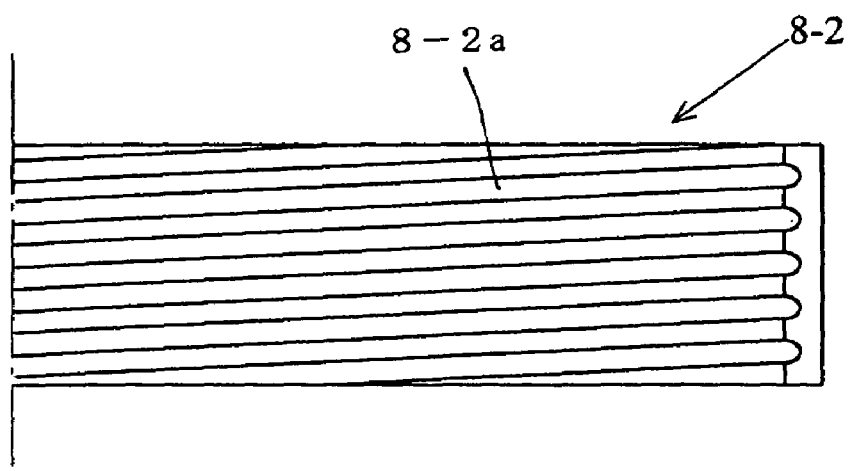
FIG. 8 shows a sectional view of apart of the upper sealing member 8-2.

FIG. 8 shows a sectional view of a part of the upper sealing member 8-2. When the rotating member 5-2 rotates in the leftward direction, its groove is formed like a left-hand thread. The radius and the depth of the groove are 0.8 mm each. The pitch between the grooves is 3 mm. The thickness of the sealing member is 1.9 mm. The outside diameter of it is 108.2 mm. The inside diameter of it is 104.4 mm. The width of it is 16.5 mm. Using its elasticity; this sealing member is fitted in the fitting groove, the inside diameter of which is 120.0 mm, arranged on the inside surface of the lower portion of the upper external cylinder 2-1. In this case, the inside diameter of the sealing member will be about 116.2 nm. As the outside diameter of the seal portion of the rotating member for agitation is 116.0 mm, the clearance between the seal portion of the rotating member 5-1 and the inside diameter of the fitted sealing member 8-1 will be about 0.1 nm on one side. Also, a plurality of grooves may be arranged in parallel.

When this embodiment is carried out at a rotational frequency of the rotating member of 150 rpm or 100 rpm, the penetration of food dough is almost completely stopped at about ⅓ or less of the width of the sealing members.

As the food dough penetrating the clearance and the groove of the sealing section is viscoelastic and integral, it is pushed back by the rotation of the groove of the sealing member installed in the rotating member 5-2. When this pushing force and the penetrating force on the food dough are balanced, the penetration of the food dough can be stopped at the balanced position. The materials adopted in the sealing division of the rotating member, the external nozzle 6, etc., would preferably stick less to food dough.

Figure 9:
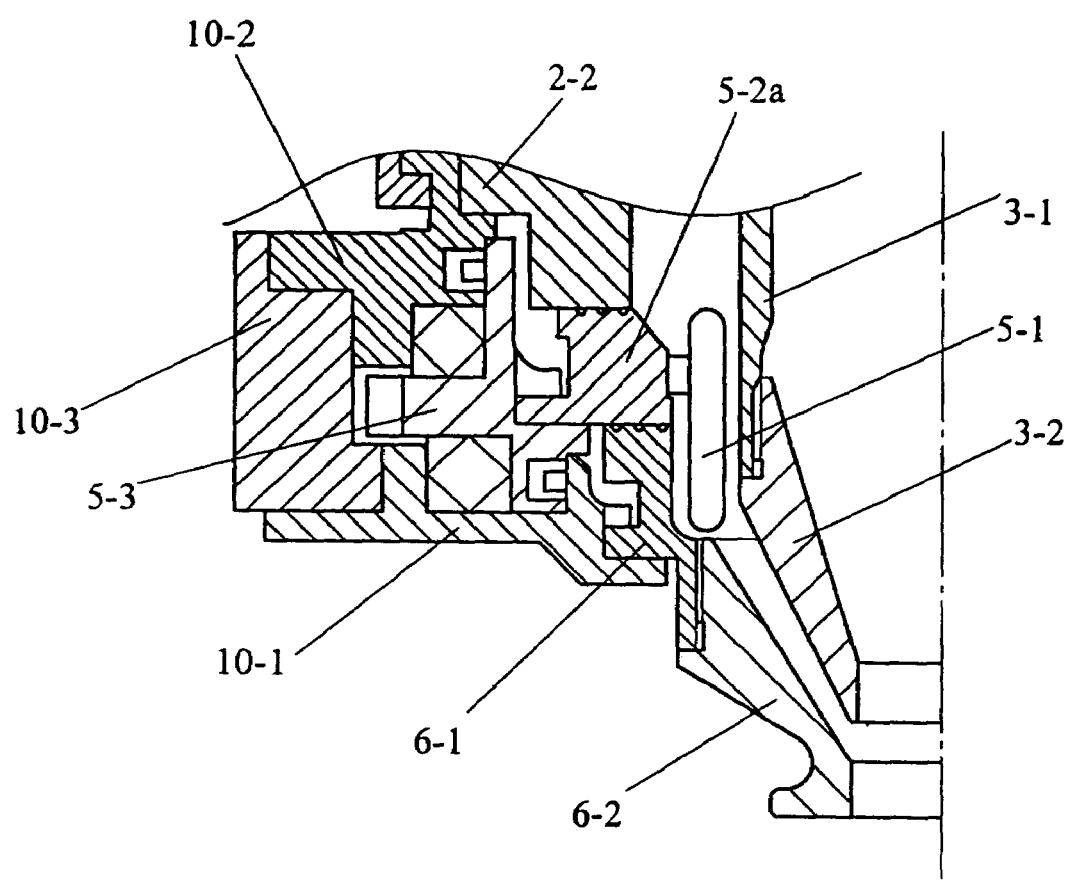
FIG. 9 shows a sectional view of a part of another embodiment of this invention in the sealing section.

FIG. 9 shows a section al view of a part of another embodiment of this invention in the sealing section. The sealing surfaces of the sealing members are constituted horizontally. One or more grooves for pushing back food dough may be arranged directly on the sealing surfaces of an external nozzle 6, an upper external cylinder 2-1, or a rotating member 5-2. These sealing surfaces may be coated by au elastic synthetic-resin that sticks less to the food dough, if necessary. The grooves for pushing back food dough may be formed in one or more volutes or swirls. The sectional shape, size, and pitch of a groove of this horizontal sealing member are the same as those of the vertical sealing-member. Also, a horizontal sealing member may be installed in a recess on the sealing surfaces of the rotating member 5-2, the external nozzle 6, or a similar recess provided on the upper external cylinder 2-1.

FIG. 10 shows a plan view of a rotating body 5 of an embodiment of this invention.

FIG. 11 shows a sectional view (F—F shown in FIG. 10) of the rotating body 5 of an embodiment of this invention. Three stirring sticks 5-1, a rotating member 5-2, a driven gear 5-3, four upper projecting members 5-4 for incorporating a rotating member 5-2 with stag members 5-1, a lower projecting member 5-5 for supporting the rotating member 5-2, four L-shaped projections 5-6, arranged in the rotating member 5-2, for being fixed in the driven gear 5-3, and four through holes 5-7 formed by the rotating member 5-2 and the driven gear 5-3, are shown in FIG. 10.

Figure 12:
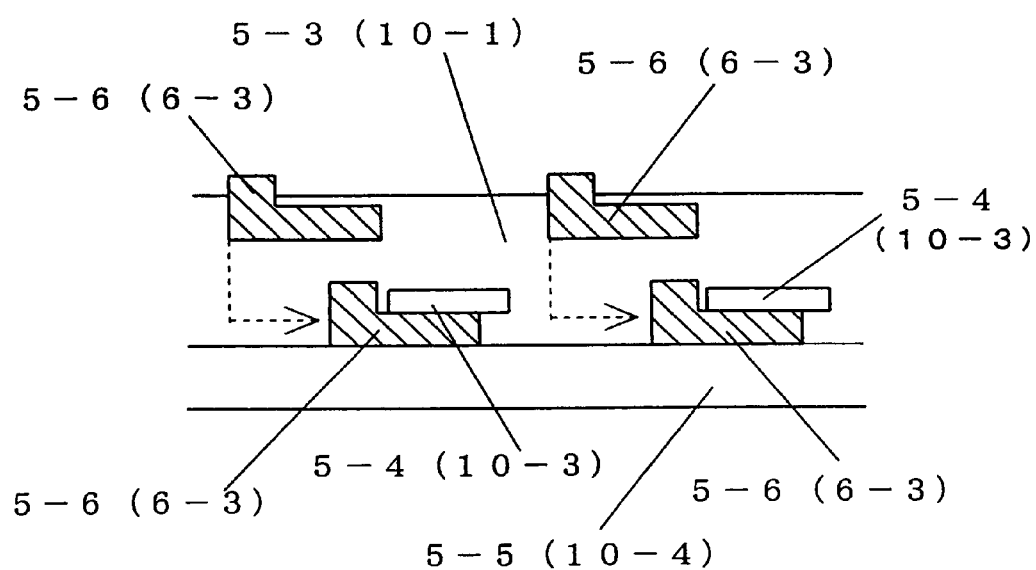
FIG. 12 shows a cross-sectional view in E—E of FIG. 5 for conceptually illustrating the assembling and disassembling processes of the rotating member 5-2 and the driven gear 5-3.

FIG. 12 shows a cross-sectional view in E—E of FIG. 5 for conceptually illustrating the assembling and disassembling processes of the rotating member 5-2 and the driven gear 5-3. L-shaped projections 5-6 of file rotating member 5-2 are shown. The rotating member 5-2, having the L-shaped projections 5-6, is lowered to the upper surface of the supporting projection 5-5. The four L-shaped projections 5-6 are passed between the four arranging projections 5-4 and brought down to the upper surface of the supporting projection 5-5. Then, the rotating member 5-2 with the four L-shaped projections 5-6 is turned to the right, until the L-shaped projections contact the arranging projections 5-4, to be fixed to the driven gear 5-3. To disassemble the rotating body 5, the rotating member 5-2 is turned to the left, so that the L-shaped projections 5-6 are pulled out from the intervals between the supporting projection 5-6 and the arranging projections 5-4. Then, the rotating member 5-2 is lifted so that the L-shaped projections 5-6 pass through the intervals between the arranging projections 5-4. Therefore, the rotating member 5-2 is removed from the driven gear 5-3.

Regarding the external nozzle part 6, it is described as follows, by also referring to FIG. 5. As described above about the rotating member 5-2, L-shaped projections 6-3 (L-shaped convex parts) of the fitting part 6-1 of the external nozzle member 6 are passed between each pair of four arranging projections 10-3 and brought down to the upper surface of a supporting projection 10-4. Then, the fitting part 6-1, together with the four L-shaped projections 6-3, is turned, and the L-shaped projections 6-3 are fastened by the gap between the arranging projections 10-3 and the supporting projection 10-4. The upper portions of the L-shaped projections 6-3 may serve as stoppers.

In this embodiment, a stirring member 5-1 is shaped like a round bar. It may be formed in another shape, such as a square-shaped bar, a flat board, a curved board, etc. Further, the arranged angle of the stirring member can be varied to be other than a vertical angle. By varying the arranged angle and the shape of a stirring member, etc., its stirring effect can be adjusted. Also, the rotational direction, rotational speed, rotational frequency, reverse turns, frequency of swinging turns, etc., can be selected to adjust the stirring effects. For the reverse or swinging turn, it is necessary to fix the rotating member 5-2 to the driven gear 5-3, by, for example, driving pins into the driven gear 5-3 at the rear ends of L-shaped projections 5-6. Also, convex parts that are to contact each other for being fixed to each other need to be processed in a high degree of precision so that they are fixed and assembled with a high degree of accuracy.

FIG. 13 shows the positional relation among the upper external cylinder 2-1 (shown by dotted lines), a fixing device 12 for fixing the upper external cylinder 2-1 into the upper portion 10-2 of the base member 10, and the upper base member 10-2 (the upper portion of the base member 10). The upper base member 10-2 includes an arranging projection 10-2a and a lower supporting projection 10-2b. The external cylinder 2 includes a ring-shaped projection 2-2. A lower fixing projection 12a, arranged with the arranging projection 10-2a, fixes the ring-shaped projection 2-2 of the upper external cylinder 2-1 between a lower supporting projection 10-2b of the upper base member 10-2 and an upper fig projection 12b of the fixing device 12 so that the upper external cylinder 2-1 is fixed in the upper base member 10-2.

FIG. 14 shows a conceptual view for illustrating the assembling and disassembling processes of the upper external cylinder 2-1, the upper base member 10-2, and the fixing device 12. The lower fixing projection 12a is lowered between the arranging projections 10-2a. Then, the upper fixing projection 12b contacts the upper surface of the ring-shaped projection 2-2. Next, the arranging device 12 is turned in the left direction and the slanted upper surfaces of the lower fixing projections 12a contact the slanted under surfaces of the arranging projections 10-2a The arranging device 12 is turned further so that the upper external cylinder 2-1 is fixed securely to the upper base member 10-2.

For removing the upper external cylinder 2-1 from the upper base member 10-2, the arranging device 12 is turned in the right direction and the lower fixing projections 12a are removed from the arranging projections 10-2a Then, the lower fixing projection 12a is lifted between the arranging projections 10-2a Consequently, the upper external cylinder 2-1 is removed from the upper base member 10-2.

FIG. 15 shows a cross sectional view in D—D of FIG. 2 of an assembly of the external cylinder 2 and the internal cylinder 3. The opening section 3-3 for supplying filling materials and the opening section 3-4 for supplying crust materials, is shown in FIG. 15. The opening pipe joint 11-1 is installed in the opening section 3-4, which is connected to the annular space section 4, of the upper external cylinder 2-1 The opening pipe joint 11-2 is installed in the opening section 3-3, which is connected to an inside of the internal cylinder 3, of the upper external cylinder 2-1.

FIG. 16 shows a diagrammatic view in longitudinal section of another embodiment of the present invention. An apparatus 1', for extruding food dough, has an external cylinder 2' and an internal cylinder 3' arranged concentrically. An external nozzle part 6', which corresponds to a lower external cylinder part 2'-2, is arranged under an upper external cylinder part 2'-1. An internal nozzle part 3'-2 is arranged under an upper internal cylinder part 3'-1. An opening 3'-3, for supplying filling materials, is arranged in the internal cylinder part 3'. Also, an opening 3'-4, for supplying crust materials, is arranged in the internal cylinder part 3'. A rotating body 5' is installed between the upper external cylinder part 2'-1 and the external nozzle part 6'. Further, a upper sliding seal portion 8'-i is arranged between the rotating body 5' and the upper external cylinder part 2'-1. Also, a lower sliding seal portion 8'-2 is arranged between the rotating body 5' and the external nozzle part 6' The rotating body 5' may be equipped with stirring members 5'-1. The rotating body 5' is composed of a rotating member 5'-2 and a driven member 5'-3, for example, like a gear. The sliding seal portions 8'-1, 8'-2 are equipped with sealing materials, such as O-rings, etc.

The rotating body 5' has a rotating member 5'-2 with stirring sticks 5'-1 and a driven gear 5'-3 supported by an upper bearing 7'-l and a lower bearing 7'-2 The rotating member 5'-2 and the driven gear 5'-3 can be easily assembled and disassembled. An upper storage space section 9'-1 is arranged between the upper bearing 7'-1 and the upper sliding seal portion 8'-1. A lower storage space section 9'-2 is arranged between the lower bearing 7'-2 and the lower sliding seal portion 8'-2. Further, an upper sealing member 7'-3 is arranged in the front of the upper bearing 7'-1 and a lower sealing member 7'-4 is arranged in the front of the lower bearing 7'-2, so that the food dough temporarily stored in the storage space section 9' does not penetrate the upper and lower bearing members 7'-1, 7'-2. The storage space section 9' includes the upper and lower space sections 9'-1, 9'-2. The gear member 5'-3 is driven by a driving gear 13 (shown in FIGS. 1 and 3). The rotating member 5'-2, which is easily incorporated in and removed from the driven gear 5'-3, has a plurality of through-holes (not shown in FIG. 16) connecting the upper storage space section 9'-1 and the lower storage space section 9'-2. The external nozzle part 6' preferably has one or more openings (not shown in FIG. 16) for discharging the food dough that has accumulated in a lower temporary storage section 9'-2 to the outside. These openings for discharging food dough to the outside may be arranged to be capable of being opened and closed, if necessary.

The upper external cylinder 2'-1 and the internal cylinder 3' are fixed by a nut member 2'-3. The upper external cylinder 2'-1 is installed in the upper base member 10'-2, using a connecting mechanism like a bayonet mechanism. The external nozzle part 6' is fixed to the lower base member 10'-4 by a nut member 14 so that they are easily assembled and disassembled. Stirring sticks 5'-1 or feeding blades (referring to JP-3032971-Y), etc. are fixed to the rotating member 5'-2, if necessary. A pipe joint 11-1 to be supplied with crust material is installed in an opening 3'-4 of the upper external cylinder 2'-1. A pipe joint 11-2, to be supplied with filling material, is installed in an opening 3'-3 of the upper external cylinder 2-1 (see FIG. 15).

According to this embodiment, the rotating member 5'-2 is easily incorporated in the driven gear member 5'-3 supported in the bearing members 7'-1, 7'-2 in the same way as illustrated regarding FIG. 12. Using the nut member 2'-3, the internal cylinder 3' is easily incorporated in the upper external cylinder 2'-1. The assembly of the internal cylinder 3' and the upper external cylinder 2'-1 is easily fixed, using the arranging device 12', on the upper base member 10'-2 in the same way as illustrated regarding FIG. 14. Using the nut member 14, the external nozzle member 6' is easily fixed in the lower base member 10'-1. Therefore, the apparatus 1' can be easily assembled. Also, it is easy to disassemble the apparatus 1' in tie reverse procedure. Accordingly, it is easy to disassemble the apparatus 1', to remove the food dough in the storage space section 9'-1, 9'-2, to dean the inside of the apparatus 1', and to assemble the apparatus 1' again. Furthermore, one or more drain openings (not shown in FIG. 16), which can be opened and closed, for discharging the food dough to the outside, may be arranged in a lower or bottom portion of the external nozzle 6'.

According to this invention, a space part for temporarily storing food dough penetrating the sealing portions is arranged. Therefore, the food dough penetrating the sealing portions can be controlled so as not to penetrate bearing portions.

Food dough can be extruded without pulsation. Also, the fluctuation of the weight per food product can be suppressed. Further, the stable condition of the extruding or encrusting operation can be maintained for a long time.

According to this invention, a stepped arrangement comprises a step-shaped section, arranged in a lower part of a base member, for fitting a lower external cylinder (for example, an external nozzle), a step-shaped section, arranged in a driven rotating body (for example, a gear), for fitting the rotating member (for example, a stirring member), and a step-shaped section, arranged in the upper part of the base member, for fitting an upper external cylinder arranged with an internal cylinder. Therefore, they can be easily disassembled and reassembled from one direction. The food dough penetrating the temporary storing section can be easily removed. Further, the machine can be easily maintained.

One of the sealing surfaces moving relatively through a gap is made of a resilient material and equipped with one or more female screw-shaped or spiral-shaped grooves thereon which generate a force for pushing back the food dough which penetrates the gap. The penetration of food dough can be suppressed by the force for pushing back or stopped at a position where the force for pushing back and the force of penetration are balanced. Further, the sealing members do not contact each other, so that the generation of heat is surpressed.

The invention claimed is:

1. An extruding apparatus using food materials including a filling material and a wrapping material to extrude and envelop the filling material with the wrapping material, the apparatus comprising:
    an internal cylinder for supplying the filling material;
    an external cylinder being concentrically arranged outside the internal cylinder, and defining an annular space for supplying the wrapping material between the external cylinder and the inner cylinder such that the cylinders extrude the materials in which the supplied wrapping material envelopes said filling material from said internal cylinder;
    a rotating member being arranged inside the external cylinder;
    at least one stirring member for stirring and fluidizing the wrapping material passing through the annular space, wherein the stirring member is mounted on the rotating member such that the stirring member is rotated or swung in the annular space;
    a driving mechanism being arranged outside the external cylinder to provide a force to drive the rotating member;
    a sealing section being sealed between the rotating member and the driving mechanism;
    a transmission mechanism for drivingly and detachably engaging the rotating member through the external cylinder and the sealing section so as to transmit the force of the driving mechanism to the rotating member; and
    a storage space section being installed near the sealing section for storing the wrapping material that has penetrated therein via the sealing section from the annular space through the rotating member to prevent further penetration of the wrapping material into the driving mechanism.

2. The extruding apparatus of claim 1, wherein the sealed section is provided with an elastic sealing member.

3. The extruding apparatus of claim 1, wherein the sealed section is provided with a gap between the rotating member and the external cylinder and has at least one helical or spiral groove.

4. An extruding apparatus using food materials including a filling material and a wrapping material to extrude and envelope the filling material with the wrapping material, the apparatus comprising:

an internal cylinder for supplying the filling material;

an external cylinder being concentrically arranged outside the internal cylinder, and defining an annular space for supplying the wrapping material between the external cylinder and the inner cylinder such that the cylinders extrude the materials in which the supplied wrapping material envelopes said filling material from said internal cylinder;

a rotating member being arranged inside the external cylinder;

at least one stirring member for stirring and fluidizing the wrapping material passing through the annular space, wherein the stirring member is mounted on the rotating member such that the stirring member is rotated or swung in the annular space;

a driving mechanism being arranged outside the external cylinder to provide a force to drive the rotating member;

a sealed section that is sealed between the rotating member and the driving mechanism;

a transmission mechanism for drivingly and detachably engaging the rotating member through the external cylinder and the sealed section so as to transmit the force of the driving mechanism to the rotating member;

a storage space section installed near the sealed section for storing the wrapping material that has penetrated therein via the sealed section from the annular space through the rotating member to prevent further penetration of the wrapping material into the driving mechanism; and a base for supporting the driving gear;
wherein the external cylinder includes an upper cylinder to be detachably fitted on the base.

5. The extruding apparatus of claim 4, wherein the sealed section is provided with an elastic sealing member.

6. The extruding apparatus of claim 4, wherein the sealed section is provided with a gap between the rotating member and the external cylinder and has at least one helical or spiral groove.

7. An extruding apparatus using food materials including a filling material and a wrapping material to extrude and envelope the filling material with the wrapping material, the apparatus comprising:

an internal cylinder for supplying the filling material;

an external cylinder being concentrically arranged outside the internal cylinder, and defining an annular space for supplying the wrapping material between the external cylinder and the inner cylinder such that the cylinders extrude the materials in which the supplied wrapping material envelopes said filling material from said internal cylinder;

a rotating member being arranged inside the external cylinder;

at least one stirring member for stirring and fluidizing the wrapping material passing through the annular space, wherein the stirring member is mounted on the rotating member such that the stirring member is rotated or swung in the annular space;

a driving mechanism being arranged outside the external cylinder to provide a force to drive the rotating member;

a sealed section that is sealed between the rotating member and the driving mechanism;

a transmission mechanism for drivingly and detachably engaging the rotating member through the external cylinder and the sealed section so as to transmit the force of the driving mechanism to the rotating member;

a storage space section installed near the sealed section for storing the wrapping material that has penetrated therein via the sealed section from the annular space through the rotating member to prevent further penetration of the wrapping material into the driving mechanism; and a base for supporting the driving gear;
wherein the external cylinder includes an upper cylinder to be detachably fitted on the base;

a step-shaped section for detachably fitting the upper cylinder on the base, thereby the rotating member and the upper external cylinder being able to be assembled and disassembled from above the base in one direction.

8. The extruding apparatus of claim 7, wherein the sealed section is provided with an elastic sealing member.

9. The extruding apparatus of claim 7, wherein the sealed section is provided with a slight gap between the rotating member and the external cylinder and has at least one helical or spiral groove.

10. An extruding apparatus using food materials including a filling material and a wrapping material to extrude and envelope the filling material with the wrapping material, the apparatus comprising:

an internal cylinder for supplying the filling material;

an external cylinder being concentrically arranged outside the internal cylinder, and defining an annular space for supplying the wrapping material between the external cylinder and the inner cylinder such that the cylinders extrude the materials in which the supplied wrapping material envelopes said filling material from said internal cylinder;

a rotating member being arranged inside the external cylinder;

at least one stirring member for stirring and fluidizing the wrapping material passing through the annular space, wherein the stirring member is mounted on the rotating member such that the stirring member is rotated or swung in the annular space;

a driving mechanism being arranged outside the external cylinder to provide a force to drive the rotating member;

a sealed section that is sealed between the rotating member and the driving mechanism;

a transmission mechanism for drivingly and detachably engaging the rotating member through the external cylinder and the sealed section so as to transmit the force of the driving mechanism to the rotating member; and a storage space section installed near the sealed section for storing the wrapping material that has penetrated therein via the sealed section from the annular space through the rotating member to prevent further penetration of the wrapping material into the driving mechanism, wherein the storage space section is provided with an outlet to discharge to the exterior the wrapping material stored therein.

11. The extruding apparatus of claim 10, wherein the sealed section is provided with an elastic sealing member.

12. The extruding apparatus of claim 10, wherein the sealed section is provided with a gap between the rotating member and the external cylinder and has at least one helical or spiral groove.

* * * * *